United States Patent
Kok et al.

(10) Patent No.: US 11,079,857 B2
(45) Date of Patent: Aug. 3, 2021

(54) OPTICAL DETECTING DEVICE

(71) Applicant: PixArt Imaging Inc., Hsin-Chu (TW)

(72) Inventors: Boon-How Kok, Penang (MY);
Keen-Hun Leong, Penang (MY);
Ching Geak Chan, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 157 days.

(21) Appl. No.: 16/558,336

(22) Filed: Sep. 3, 2019

(65) Prior Publication Data

US 2021/0064151 A1   Mar. 4, 2021

(51) Int. Cl.
*G06F 3/03* (2006.01)
*G06T 1/00* (2006.01)
*G06T 1/20* (2006.01)
*G06T 1/60* (2006.01)
*G05D 1/00* (2006.01)

(52) U.S. Cl.
CPC .......... *G06F 3/0304* (2013.01); *G06T 1/0007* (2013.01); *G06T 1/20* (2013.01); *G06T 1/60* (2013.01); *G05D 1/0088* (2013.01)

(58) Field of Classification Search
CPC ... G05D 1/0088; G06F 3/0304; G06T 1/0007; G06T 1/20; G06T 1/60
See application file for complete search history.

(56) References Cited

U.S. PATENT DOCUMENTS

| | | | | |
|---|---|---|---|---|
| 5,111,401 A * | 5/1992 | Everett, Jr. | .......... | G05D 1/0242 701/24 |
| 6,161,484 A * | 12/2000 | Ferbeck | ................. | B62D 1/265 104/243 |
| 8,880,273 B1 * | 11/2014 | Chatham | ................ | G08G 1/167 701/28 |
| 9,488,984 B1 * | 11/2016 | Williams | ............. | G06K 9/2036 |
| 10,004,564 B1 * | 6/2018 | Beck | ...................... | G06T 7/0012 |
| 2003/0106731 A1 * | 6/2003 | Marino | .................... | B62D 1/28 180/168 |
| 2010/0288573 A1 * | 11/2010 | Nishina | ................... | B60R 11/04 180/272 |
| 2012/0162389 A1 * | 6/2012 | Seo | ........................ | G03B 35/04 348/49 |
| 2012/0293549 A1 * | 11/2012 | Osako | ....................... | G06T 7/73 345/633 |

(Continued)

FOREIGN PATENT DOCUMENTS

DE    19650369 A1 *   4/1998   ........... G05D 1/0246

*Primary Examiner* — Yubin Hung
(74) *Attorney, Agent, or Firm* — Winston Hsu

(57) ABSTRACT

An optical detecting device with a tracking function includes an image acquiring module and a processor. The image acquiring module is grouped into a first cluster and a second cluster of pixels. The first cluster and the second cluster are arranged adjacent to each other, and used to respectively acquire a first imaging result and a second imaging result both containing an indicating mark. The processor is electrically connected to the image acquiring module and adapted to track a proceeding direction of the indicating mark by computing difference between the first imaging result and the second imaging result. The optical detecting device further includes a memory module electrically connected to the processor, and the processor analyzes the computed difference via a lookup table stored inside the memory module to determine the proceeding direction.

21 Claims, 13 Drawing Sheets

(56) References Cited

U.S. PATENT DOCUMENTS

2016/0314359 A1* 10/2016 Sakamoto .......... G01C 21/3602
2018/0088587 A1*  3/2018 Lee ..................... G05D 1/0238
2019/0041854 A1*  2/2019 Millhouse ............. G16H 40/20

* cited by examiner

OPTICAL DETECTING DEVICE

BACKGROUND OF THE INVENTION

1. Field of the Invention

The present invention relates to an optical detecting device, and more particularly, to an optical detecting device with a tracking function.

2. Description of the Prior Art

With an advanced technology, an automated guided vehicle utilizes laser guide solution, magnetic guide solution, inductive guide solution, or vision guide solution to decide its proceeding direction. The above-mentioned conventional guide solutions have drawbacks of expensive cost, complicated computation and a long responding period. If the laser sensor, the magnetic sensor, the inductive sensor or the vision sensor is embedded in the automated guided vehicle, a customized and costly tracking system has to design and install for the said sensor. Thus, design of an optical detecting device using optical technology to analyze the scene/image for motion tracking purpose is an important issue in the related industry.

SUMMARY OF THE INVENTION

The present invention provides an optical detecting device with a tracking function for solving above drawbacks.

According to the claimed invention, an optical detecting device with a tracking function includes an image acquiring module and a processor. The image acquiring module is grouped into a first cluster and a second cluster of pixels. The first cluster and the second cluster are arranged adjacent to each other, and used to respectively acquire a first imaging result and a second imaging result both containing an indicating mark. The processor is electrically connected to the image acquiring module and adapted to track a proceeding direction of the indicating mark by computing difference between the first imaging result and the second imaging result. The optical detecting device further includes a memory module electrically connected to the processor, and the processor analyzes the computed difference via a lookup table stored inside the memory module to determine the proceeding direction.

According to the claimed invention, the optical detecting device is applied to an automated guided vehicle, and the processor outputs a control command to steer the automated guided vehicle according to the proceeding direction. The processor utilizes image identifying technique to identify an arrow icon on the indicating mark, and generates the control command to steer the automated guided vehicle according to the arrow icon. The processor analyzes a color of the indicating mark and generates the control command according to a color analyzing result.

According to the claimed invention, the image acquiring module includes one image detector, and an image acquired by the image detector is grouped into a pixel array of the first cluster and a pixel array of the second cluster. The image acquiring module includes a first image detector and a second image detector. A first image acquired by the first image detector is a pixel array of the first cluster, and a second image acquired by the second image detector is a pixel array of the second cluster. An arranging direction of the first cluster and the second cluster is crossed by a lengthwise direction of the indicating mark. A boundary between the first cluster and the second cluster aligns with a middle of the indicating mark. A dimension of the first cluster is similar to or identical with a dimension of the second cluster.

According to the claimed invention, the processor acquires a first computed value of the first cluster and a second computed value of the second cluster, and then decides the proceeding direction according to a ratio of the first computed value to the second computed value. The first computed value and the second computed value are mean values of the first cluster and the second cluster. The image acquiring module is further grouped into the first cluster, the second cluster, a third cluster and a fourth cluster of pixels, the third cluster and the fourth cluster are arranged adjacent to each other and respectively align with the first cluster and the second cluster. A dimension of the third cluster is similar to or identical with a dimension of the fourth cluster. The processor further computes difference between a third imaging result of the third cluster and a fourth imaging result of the fourth cluster for determining the proceeding direction via the computed differences between the first cluster and the second cluster and between the third cluster and the fourth cluster.

According to the claimed invention, the processor adjusts a sampling speed of the image acquiring module according to a bending degree of the indicating mark. The processor acquires a first distributed value of the first cluster and a second distributed value of the second cluster, and determines width variation of the indicating mark according to the first distributed value and the second distributed value. The first distributed value and the second distributed value are a ratio of a specific pixel value to a background pixel value. The optical detecting device is applied to an automated guided vehicle, and the processor outputs a control command according to the width variation for adjusting a moving speed of the automated guided vehicle.

According to the claimed invention, the first cluster is at least one row of pixels crossed by a lengthwise direction of the indicating mark. The image acquiring module has a field of view for facing the indicating mark, and acquires an image matrix constructed from pixel arrays of the first cluster and the second cluster.

The optical detecting device of the present invention can have the image acquiring module grouped into two or more clusters of pixels with the same dimensions. The image acquiring module grouped into the large number of clusters can detect small variation inside the image for providing preferred detection accuracy and smoothing veering motion of the automated guided vehicle. The image acquiring module has the large-size image sensor can further improve its overall detection accuracy. The imaging result of each cluster of the image acquiring module can be updated in every reposting frame for preferred tracking and turning precision.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
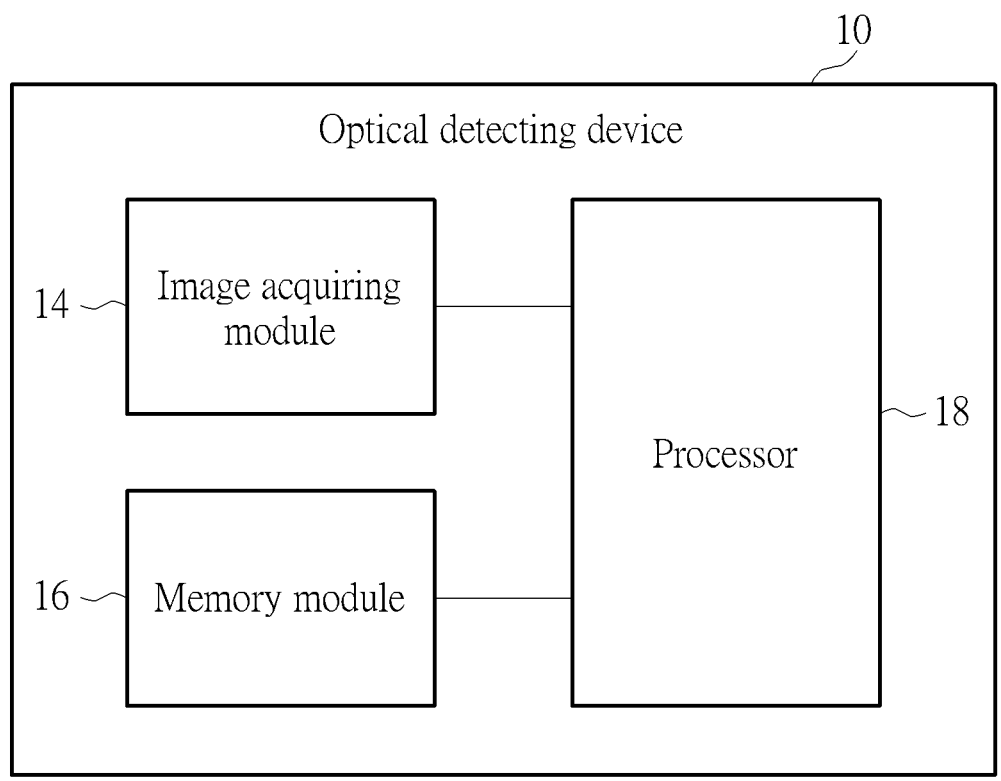
FIG. 1 is a functional block diagram of an optical detecting device according to an embodiment of the present invention.
Figure 2:
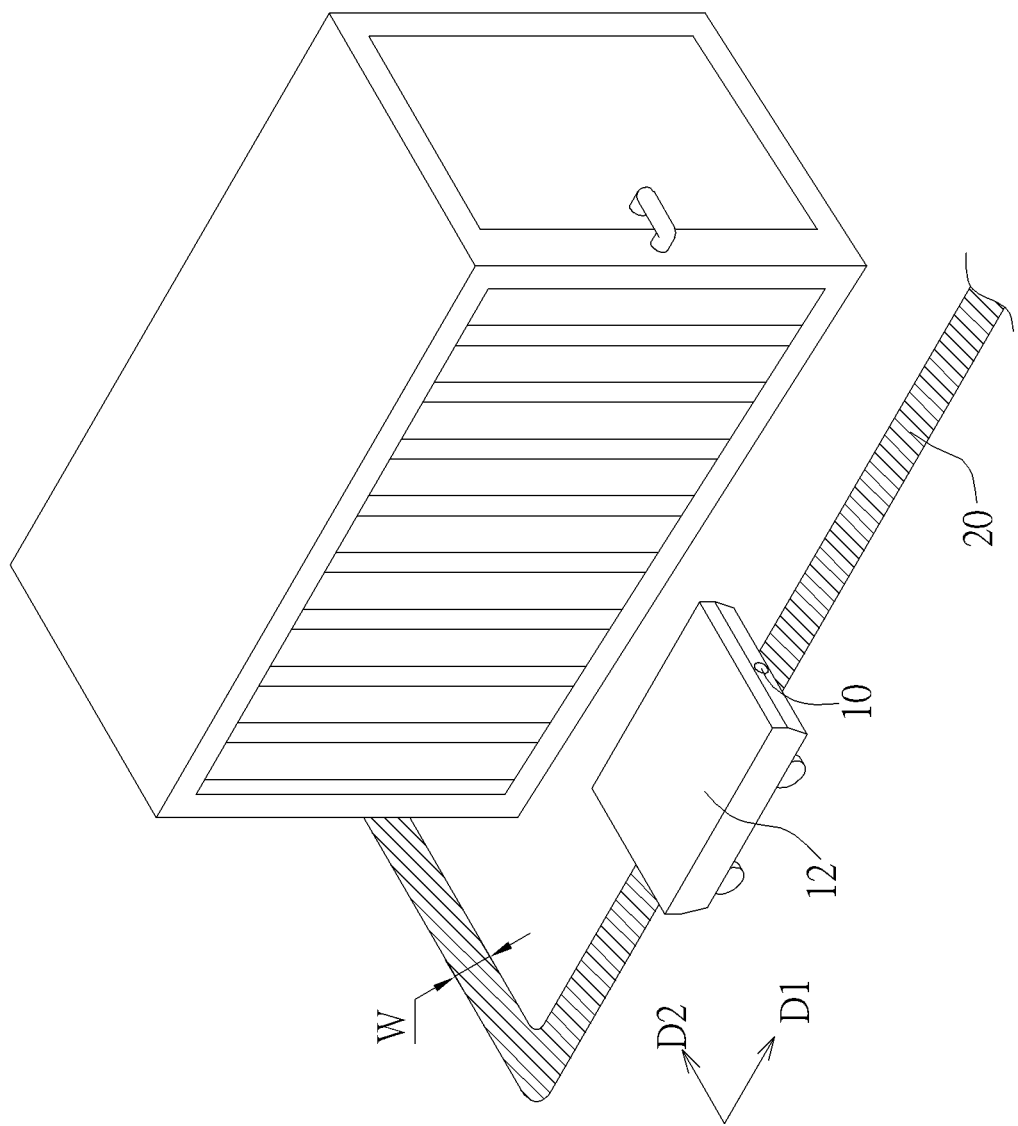
FIG. 2 is a diagram of an automated guided vehicle with the optical detecting device according to the embodiment of the present invention.

Please refer to FIG. 1 and FIG. 2. FIG. 1 is a functional block diagram of an optical detecting device 10 according to an embodiment of the present invention. FIG. 2 is a diagram of an automated guided vehicle 12 with the optical detecting device 10 according to the embodiment of the present invention. The optical detecting device 10 can be installed on the automated guided vehicle 12 and have a field of view for facing the ground. The optical detecting device 10 can include an image acquiring module 14, a memory module 16 and a processor 18 electrically connected to each other. The image acquiring module 14 can acquire an image about an indicating mark 20 painting on the ground. The memory module 16 is an optional unit, which can be independent of the processor 18 or a built-in unit of the processor 18. The memory module 16 can store some data, such as a predefined lookup table, used to analyze the image about the indicating mark 20. The processor 16 can utilize the lookup table to analyze the indicating mark 20, so as to track a proceeding direction D1 and/or variation of a width W of the indicating mark 20 and to output a control command for steering the automated guided vehicle 12.

Figure 3:
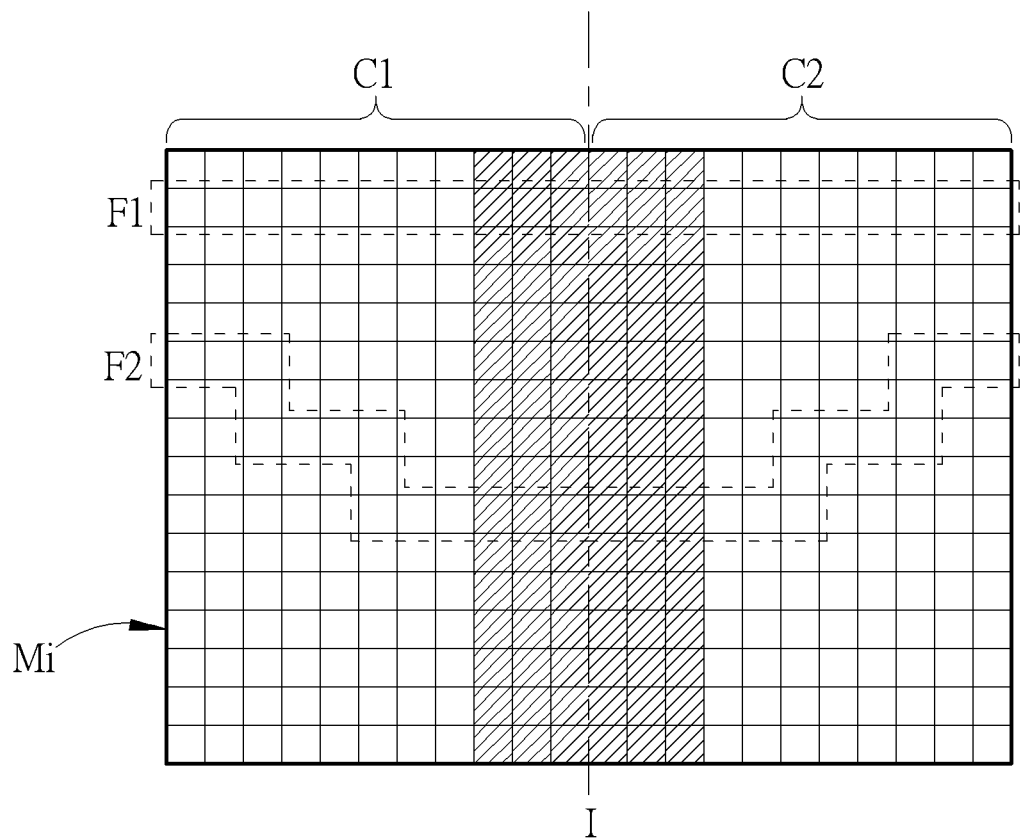
FIG. 3 and FIG. 4 are diagrams of an image acquired by an image acquiring module at different points of time according to the embodiment of the present invention.
Figure 4:
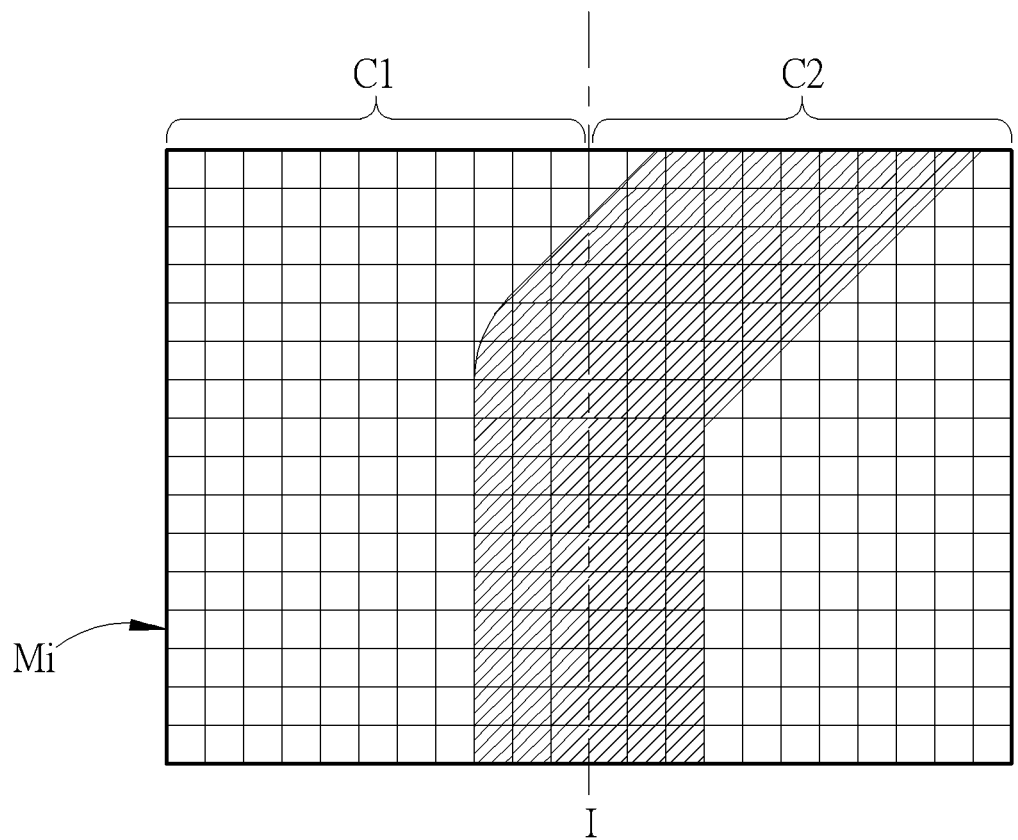

Please refer to FIG. 3 and FIG. 4. FIG. 3 and FIG. 4 are diagrams of the image I acquired by the image acquiring module 14 at different points of time according to the embodiment of the present invention. The image I can have an image matrix Mi constructed from pixel arrays of a first cluster C1 and a second cluster C2, which means the image acquiring module 14 can be grouped into the first cluster C1 and the second cluster C2 of pixels. A dimension of the first cluster C1 can be similar to or identical with a dimension of the second cluster C2. The first cluster C1 and the second cluster C2 can be arranged adjacent to each other; for example, an arranging direction D2 of the first cluster C1 and the second cluster C2 can be crossed by a lengthwise direction of the indicating mark 20. The lengthwise direction may be viewed as the proceeding direction D1. The first cluster C1 of pixels can acquire a first imaging result, and the second cluster C2 of pixels can acquire a second imaging result. The first imaging result and second imaging result both contain a part of the indicating mark 20.

The first cluster C1 and the second cluster C2 can be at least one row of pixels within the image matrix Mi, and the at least one row of pixels can be crossed by the lengthwise direction of the indicating mark 20. As shown in FIG. 3, the first cluster C1 and the second cluster C2 can be represented as a dotted frame F1 or a dotted frame F2 in response to an example of one row of pixels, or a left half of the image matrix Mi can be the first cluster C1 and a right half of the image matrix Mi can be the second cluster C2.

A boundary between the first cluster C1 and the second cluster C2 preferably can align with a middle of the indicating mark 20. The processor 18 can compute difference between the first imaging result and second imaging result and compare the computed difference with the lookup table stored inside the memory module 16 to decide the proceeding direction D1 of the indicating mark 20. A first computed value of the first imaging result and a second computed value of the second imaging result can be acquired, and then a ratio of the first computed value to the second computed value can be interpreted as the proceeding direction D1. In the image matrix Mi, slash grids can represent the indicating mark 20 and blank grids can represent a roadway on the ground. As shown in FIG. 3, the first computed value of the first cluster C1 is similar to or identical with the second computed value of the second cluster C2, so the foresaid ratio is constant or varied within a tolerated range, and the automated guided vehicle 12 can go straight by following the indicating mark 20. As shown in FIG. 4, if the first computed value is different from the second computed value, the foresaid ratio is varied over the tolerated range, and the indicating mark 20 makes a turn, so the optical detecting device 10 can veer the automated guided vehicle 12 in accordance with the foresaid ratio.

When the computing difference between the first imaging result and the second imaging result (or the ratio of the first computed value to the second computed value) is changed violently, a bending degree of the indicating mark 20 may be huge, so that the processor 18 can adjust a sampling speed of the image acquiring module 10 and/or speed up veering of the automated guided vehicle 12 according to the bending degree In the embodiment, the roadway may be painted by light color and the indicating mark 20 may be painted by deep color for providing sufficient contrast, or the roadway can be painted by the deep color and thus the indicating mark 20 can be painted by the light color. The first computed value and the second computed value can be, but not limited to, mean values, median values, aggregate values, and a combination thereof about the first cluster C1 and the second cluster C2 of pixels. In the embodiment shown in FIGS. 3-4, the boundary between the first cluster C1 and the second cluster C2 align with the middle of the indicating mark 20, so that the first computed value is similar to or identical with the second computed value and the foresaid ratio is nearly equal to one; if the foresaid ratio is changed and deviated over the tolerated range, the optical detecting device 10 can understand that the automated guided vehicle 12 can make a turn by following the proceeding direction D1.

Figure 5:
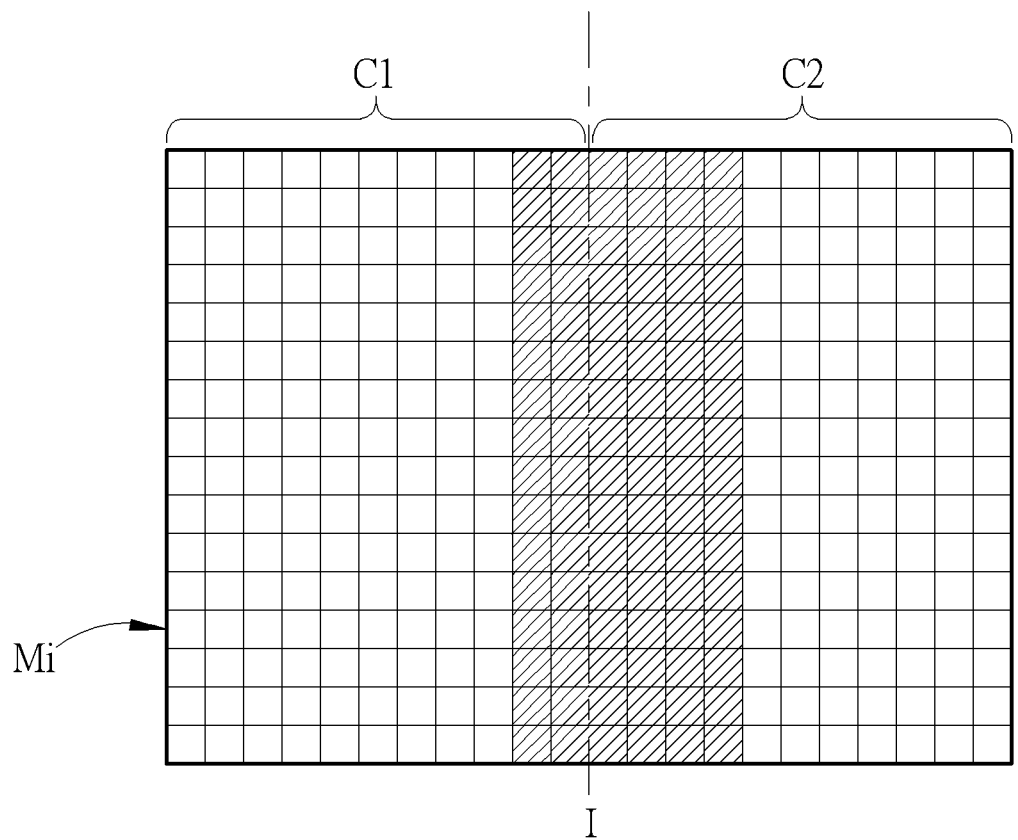
FIG. 5 is a diagram of the image according to another embodiment of the present invention.

In another possible embodiment, the boundary between the first cluster C1 and the second cluster C2 may not align with the middle of the indicating mark 20. Please refer to FIG. 5. FIG. 5 is a diagram of the image I according to another embodiment of the present invention. The first computed value is different from the second computed value, and the foresaid ratio can be larger than or smaller than one; however, the foresaid ratio still can be kept within the tolerated range. If the foresaid ratio is changed over the tolerated range, the optical detecting device 10 can veer the automated guided vehicle 12 due to change of the proceeding direction D1.

Figure 6:
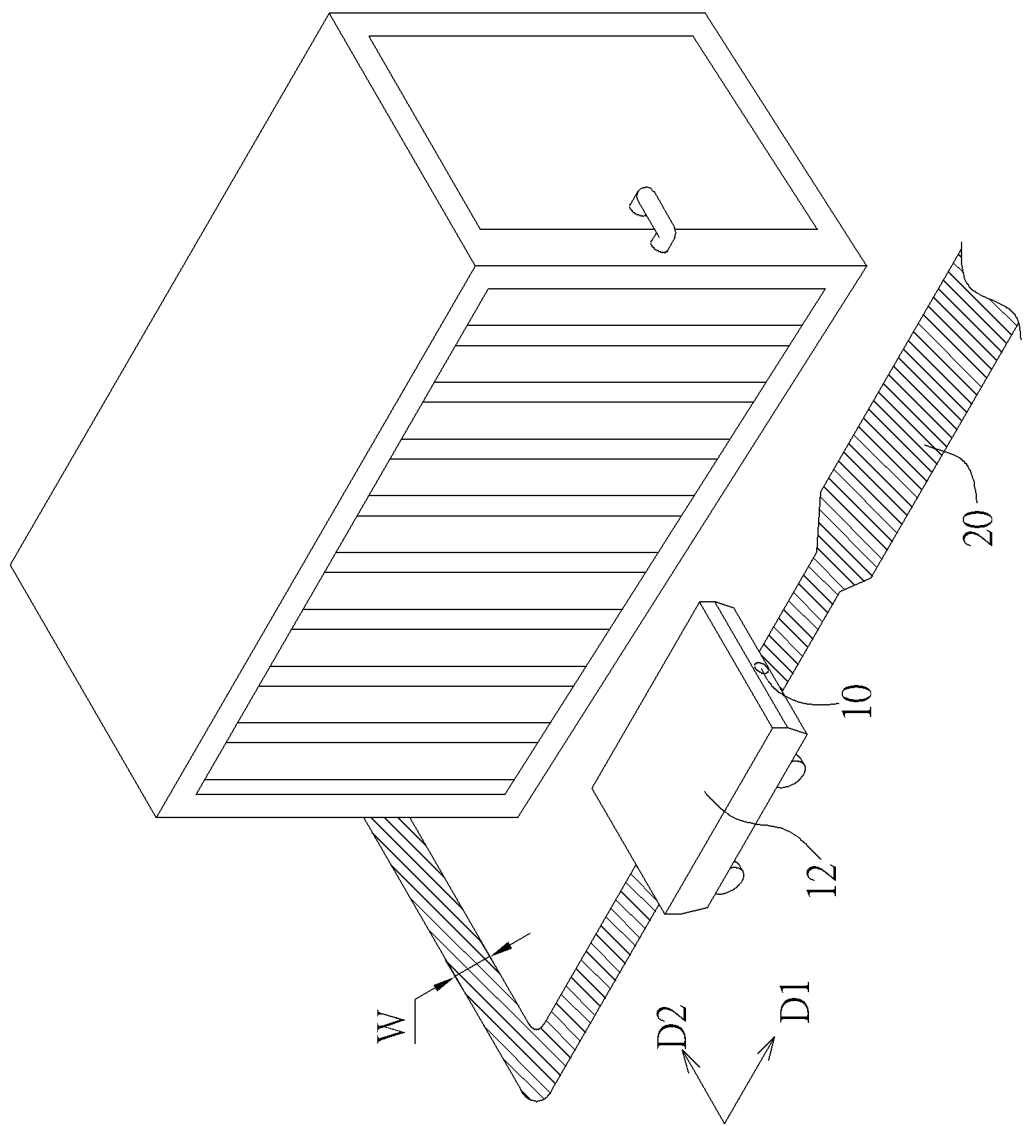
FIG. 6 is a diagram of the automated guided vehicle tracing an indicating mark according to another embodiment of the present invention.
Figure 7:
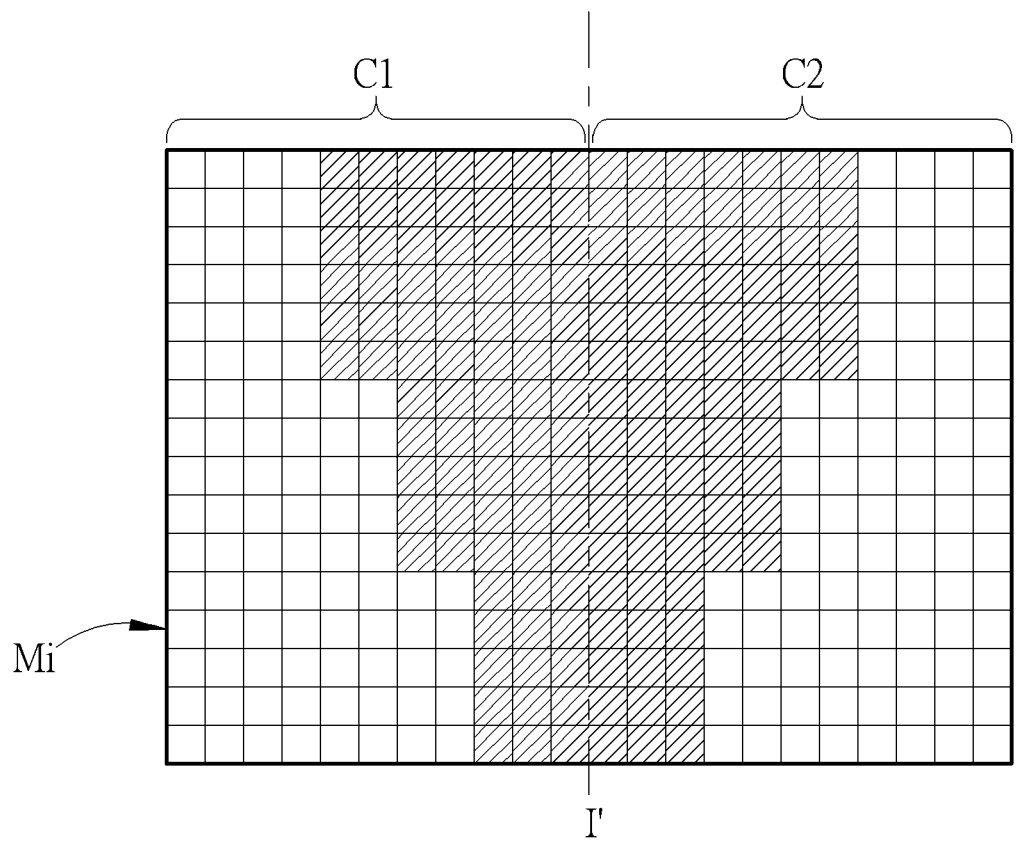
FIG. 7 is a diagram of the image about the indicating mark according to another embodiment of the present invention.

The above-mentioned embodiment illustrates a condition of the indicating mark 20 with the invariable width W. A ratio of the slash grids to the blank grids about each cluster can be always kept within a specific range when the automated guided vehicle 12 follows the straight indicating mark 20. Please refer to FIG. 6 and FIG. 7. FIG. 6 is a diagram of the automated guided vehicle 12 tracing the indicating mark 20' according to another embodiment of the present invention. FIG. 7 is a diagram of the image I' about the indicating mark 20' according to another embodiment of the present invention. In this embodiment, the optical detecting device 10 can acquire a first distributed value of the first cluster C1 and a second distributed value of the second cluster C2. The said distributed value can be ratio of a specific pixel value to a background pixel value; the specific pixel value can be the slash grid and the background pixel value can be the blank grids. The optical detecting device 10 can analyze change of the first distributed value and the second distributed value, so as to determine width variation of the indicating mark 20 and adjust a moving speed of the automated guided vehicle 12.

In the embodiment shown in FIG. 6 and FIG. 7, the boundary between the first cluster C1 and the second cluster C2 may align or not align with the middle of the indicating mark 20. If at least one of the first distributed value and the second distributed value is enlarged, the width W of the indicating mark 20 can be gradually increased; if at least one of the first distributed value and the second distributed value is reduced, the width W of the indicating mark 20 can be gradually decreased. The optical detecting device 10 can speed up the automated guided vehicle 12 when detecting the indicating mark 20 with the gradually increased width W, and slow down the automated guided vehicle 12 when detecting the indicating mark 20 with the gradually decreased width W. Further, the optical detecting device 10 may speed up the automated guided vehicle 12 in response to the narrow indicating mark 20 and slow down the automated guided vehicle 12 in response to the broad indicating mark 20.

Figure 8:
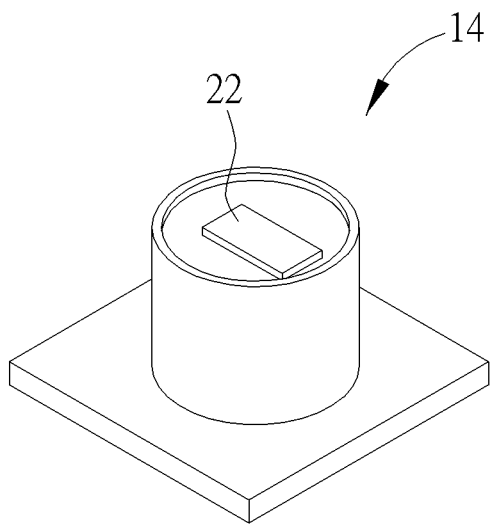
FIG. 8 is a diagram of the image acquiring module according to a first embodiment of the present invention.
Figure 9:
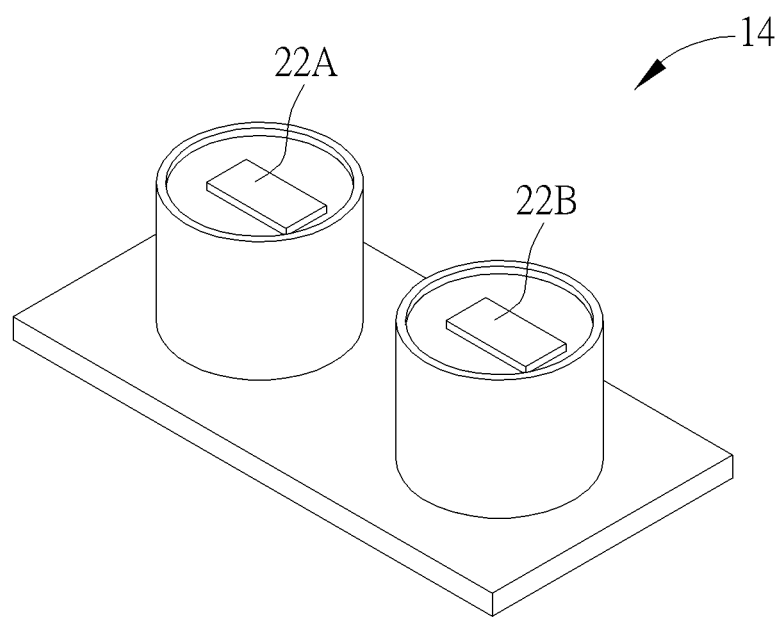
FIG. 9 is a diagram of the image acquiring module according to a second embodiment of the present invention.

Please refer to FIG. 8 and FIG. 9. FIG. 8 is a diagram of the image acquiring module 14 according to a first embodiment of the present invention. FIG. 9 is a diagram of the image acquiring module 14 according to a second embodiment of the present invention. In the first embodiment, the image acquiring module 14 can include one image sensor 22. The image sensor 22 can capture one image, and the image matrix can be grouped into the pixel array of the first cluster C1 and the pixel array of the second cluster C2. In the second embodiment, the image acquiring module 14 can include a first image detector 22A and a second image detector 22B respectively used to capture a first image and a second image. An amount of the image detectors corresponds to an amount of the clusters. A field of view of the first image detector 22A may overlap or not overlap with a field of view of the second image detector 22B. The image matrix of the first image can be the pixel array of the first cluster C1, and the image matrix of the second image can be the pixel array of the second cluster C2.

Figure 10:
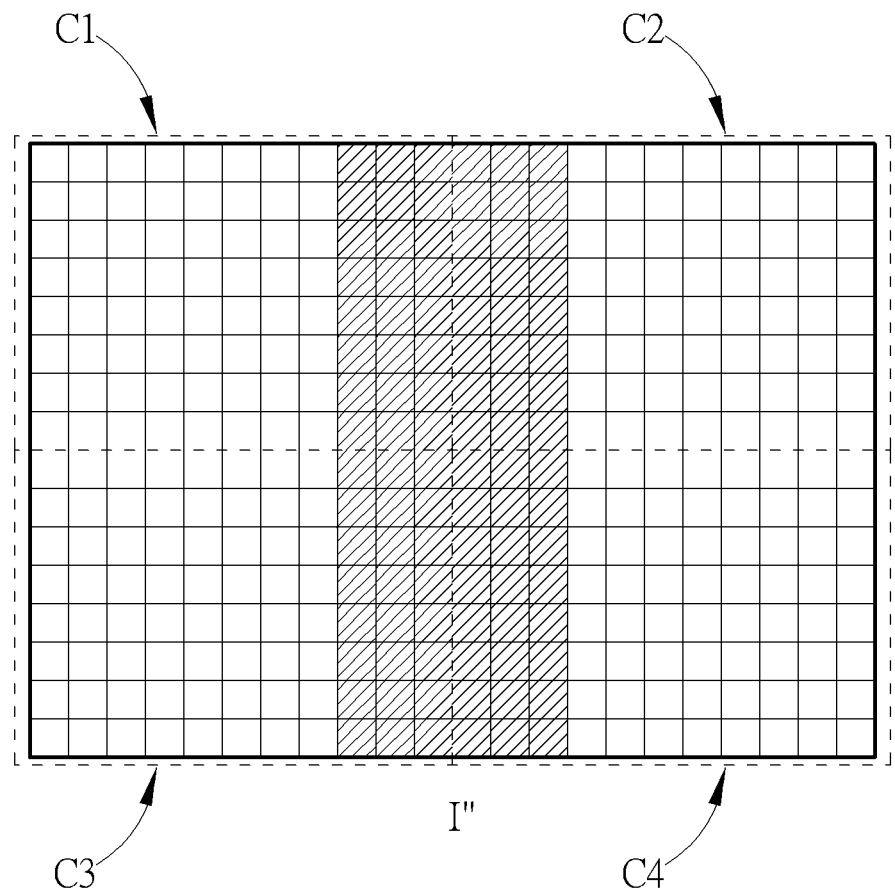
FIG. 10, FIG. 11 and FIG. 12 are diagrams of the image according to another embodiment of the present invention.
Figure 11:
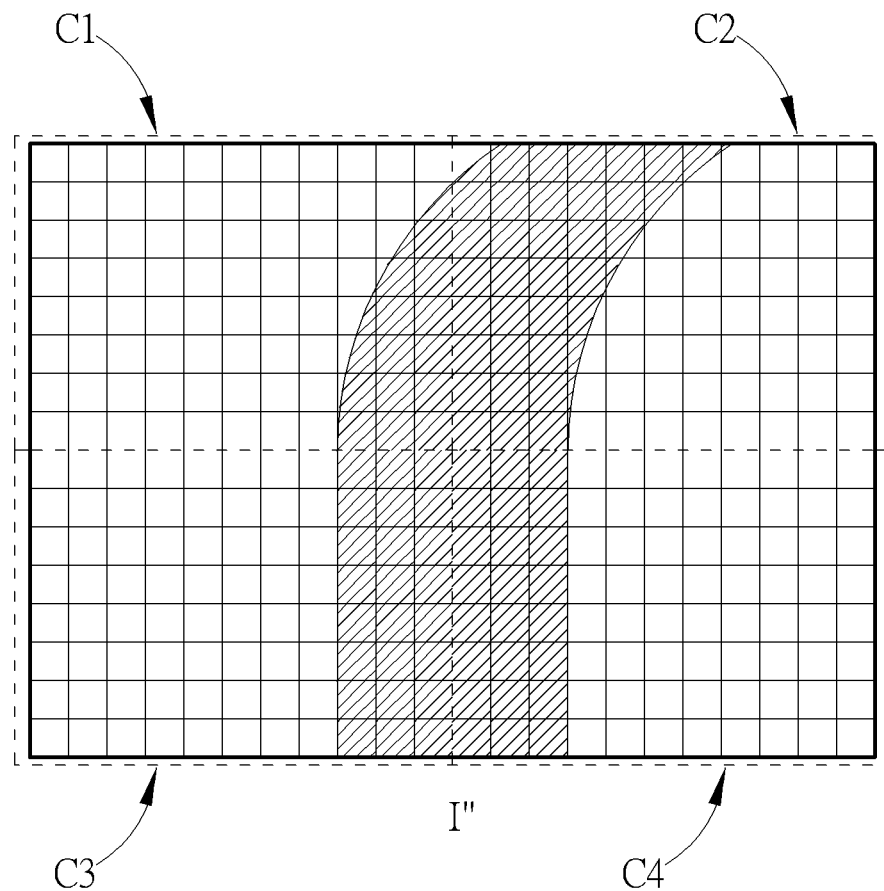
Figure 12:
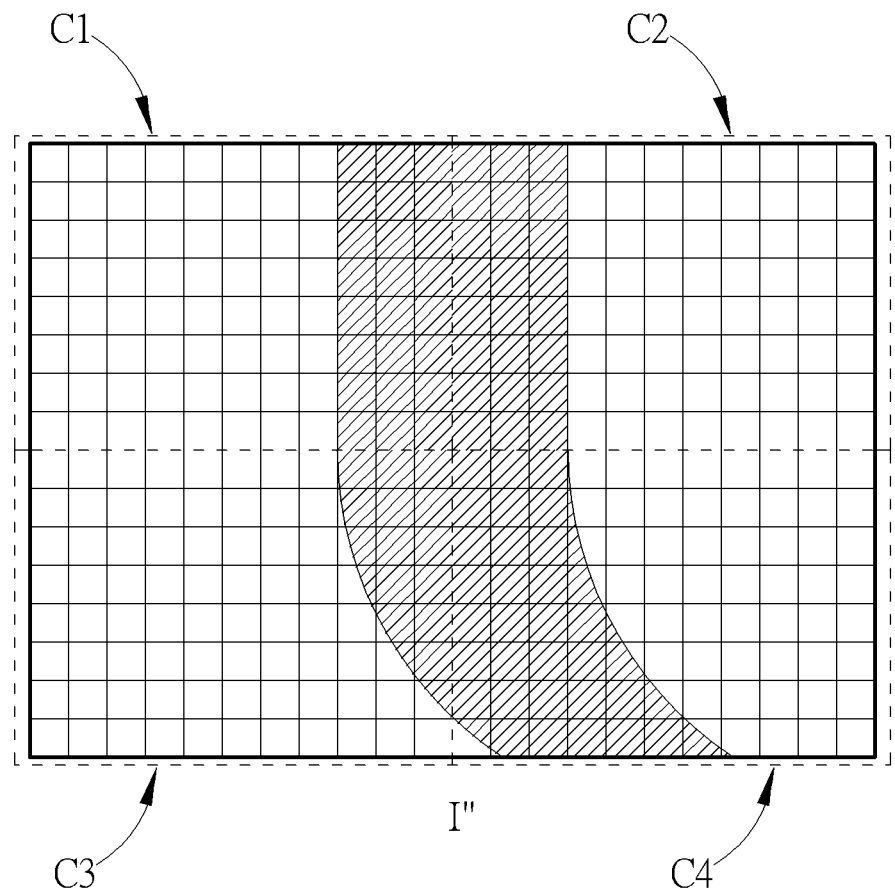

Please refer to FIG. 10, FIG. 11 and FIG. 12. FIG. 10, FIG. 11 and FIG. 12 are diagrams of an image I" according to another embodiment of the present invention. The image acquiring module 14 which acquires the image I" can be grouped into the first cluster C1, the second cluster C2, a third cluster C3 and a fourth cluster C4 of pixels. The third cluster C3 and the fourth cluster C4 can be arranged adjacent to each other. The third cluster C3 can adjoin the first cluster C1, and the fourth cluster C4 can adjoin the second cluster C2. In the embodiment, the image acquiring module 14 may have one image sensor with a pixel array divided into four sections, or may have two image sensors and each image sensor is divided into two sections, or may have four image sensors respectively corresponding to one of the four clusters. A dimension of the third cluster C3 preferably can be similar to or identical with a dimension of the fourth cluster C4. The dimension of the third cluster C3 or the fourth cluster C4 may be similar or dissimilar to the dimension of the first cluster C1 or the second cluster C2.

The optical detecting device 10 can compute difference between a third imaging result of the third cluster C3 and a fourth imaging result of the fourth cluster C4. The first computed difference between the first imaging result and second imaging result, and the second computed difference between the third imaging result and the fourth imaging result can be utilized to determine the proceeding direction D1 of the indicating mark 20. When the first computed difference and the second computed difference are both within the tolerated range, the indicating mark 20 can be interpreted as a straight line, so that the optical detecting device 10 does not veer the automated guided vehicle 12, as shown in FIG. 10. If the first computed difference is varied over the tolerated range and the second computed difference is still kept within the tolerated range, the indicating mark 20 can be interpreted as ready to bend, so the optical detecting device 10 can output the control command to speed up or slow down the automated guided vehicle 12 for veering, as shown in FIG. 11. If the first computed difference is kept within the tolerated range and the second computed difference is varied over the tolerated range, the indicating mark 20 can be changed from a curve to a straight, and the optical detecting device 10 can speed up or slow down the automated guided vehicle 12 for veering, as shown in FIG. 12.

The image acquiring module 14 can be grouped into several clusters, and an amount of the cluster preferably can be even. The image acquiring module 14 which has a large number of clusters can provide preferred reliability. For example, the image matrix grouped into four clusters C1, C2, C3 and C4 can divide the indicating mark 20 into a head section and a rear section, and thus the optical detecting device 10 can accurately catch the bending degree of the indicating mark 20 when the first computed difference or the second computed difference is slightly changed. If the image matrix is grouped into six clusters, the indicating mark 20 may be divided into the head section, the rear section and a middle section, and then the optical detecting device 10 can compute the proceeding direction D1 and the bending degree of the indicating mark 20 rapidly and accurately.

Figure 13:
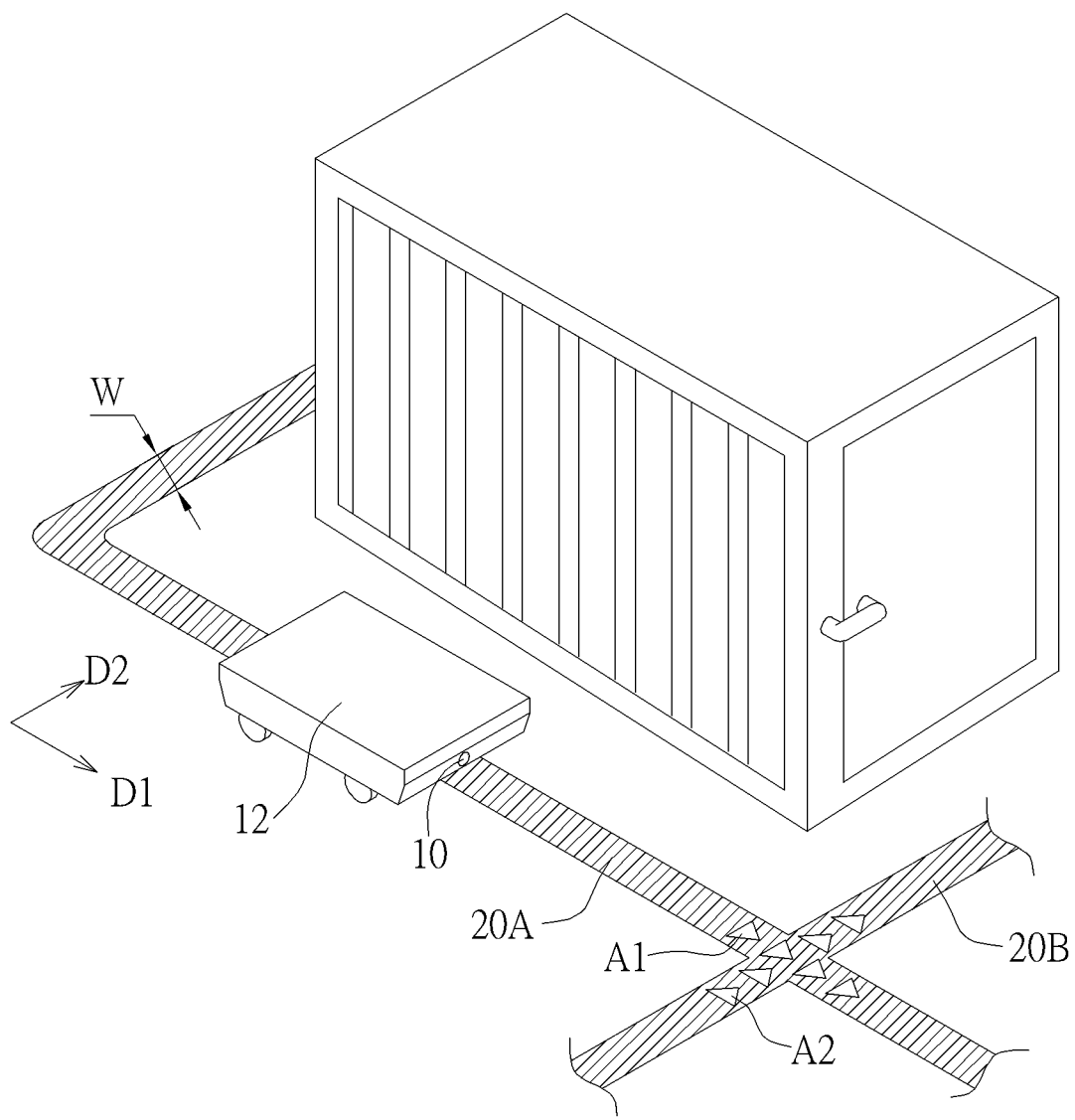
FIG. 13 and FIG. 14 are diagrams of the automated guided vehicle according to other possible embodiments of the present invention.
Figure 14:
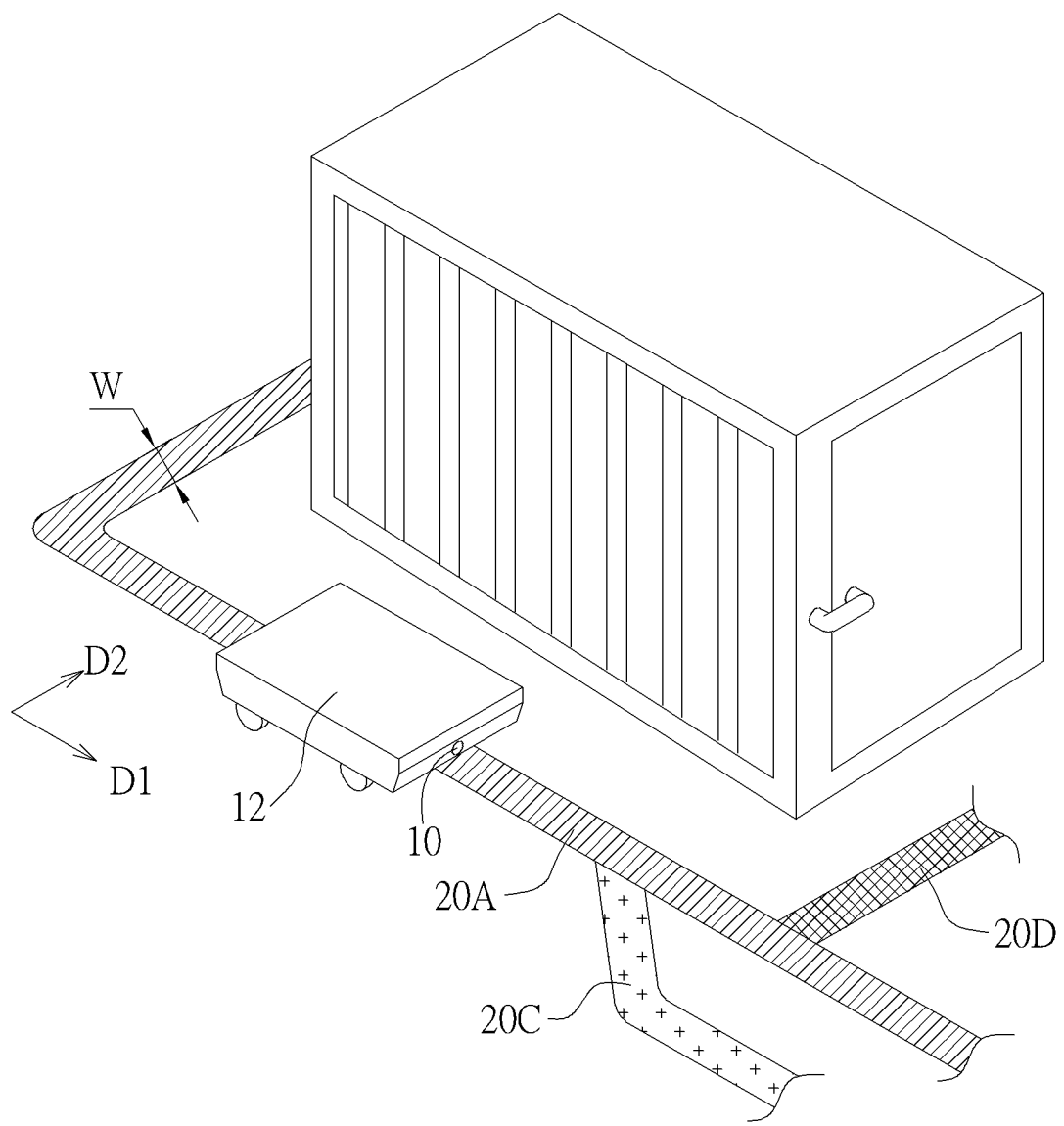

Please refer to FIG. 13 and FIG. 14. FIG. 13 and FIG. 14 are diagrams of the automated guided vehicle 12 according to other possible embodiments of the present invention. As the embodiment shown in FIG. 13, several indicating marks 20A and 20B may be crossed and painted on the ground. Each indicating mark 20A or 20B can respectively contain one arrow icon A1 or A2 located at an intersection. The optical detecting device 10 can have an image identifying function to identify an indicating direction of the arrow icon A1 or A2 for steering the automated guided vehicle 12. If the automated guided vehicle 12 follows the indicating mark 20A or 20B, the optical detecting device 10 can identify at least one specific features of the arrow icon A1 or A2, such as a shape, coating or any available feature, and then steer the automated guided vehicle 12 in accordance with the indicating mark 20A or 20B.

For example, when the automated guided vehicle 12 follows the indicating mark 20A, the optical detecting device 10 can identify the arrow icon A1 before reaching the intersection. Therefore, the optical detecting device 10 can decide that the indicating mark 20A has higher priority than the indicating mark 20B because of the shape and the indicating direction of the arrow icon A1, so as to steer the automated guided vehicle 12 along the indicating mark 20A, without being interfered with the indicating mark 20B. Accordingly, if the automated guided vehicle 12 follows the indicating mark 20B, the optical detecting device 10 can steer the automated guided vehicle 12 along the arrow icon A2 when passing the intersection.

As the embodiment shown in FIG. 14, the indicating mark 20A may have several forked marks, such as the indicating marks 20C and 20D. The indicating marks 20A, 20C and 20D can be painted by different colors or different decorative patterns. The optical detecting device 10 can determine whether to veer the automated guided vehicle 12 by identifying the color and/or the decorative pattern of the indicating mark 20A, 20C and 20D. As the automated guided vehicle 12 arrives a first intersection of the indicating marks 20A and 20C, the optical detecting device 10 can distinguish the indicating mark 20A from the indicating mark 20C, and determine whether the automated guided vehicle 12 follows the indicating mark 20A or 20C according to an accepted command and an identifying result about the indicating marks 20A and 20C.

For example, if the automated guided vehicle 12 is prepared to transport goods, the optical detecting device 10 may steer the automated guided vehicle 12 along the indicating mark 20A to somewhere the truck is parked. If the automated guided vehicle 12 is prepared to deliver rubbish, the optical detecting device 10 may steer the automated guided vehicle 12 along the indicating mark 20C to the scrap heap. Accordingly, the optical detecting device 10 can steer the automated guided vehicle 12 along the indicating mark 20A or 20D due to the accepted command and a related identifying result.

In conclusion, the optical detecting device of the present invention can have the image acquiring module grouped into two or more clusters of pixels with the same dimensions. The image acquiring module grouped into the large number of clusters can detect small variation inside the image for providing preferred detection accuracy and smoothing veering motion of the automated guided vehicle. The image acquiring module has the large-size image sensor can further improve its overall detection accuracy. The imaging result of each cluster of the image acquiring module can be updated in every reposting frame for preferred tracking and turning precision.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical detecting device with a tracking function, comprising
    an image acquiring module grouped into a first cluster and a second cluster of pixels, the first cluster and the second cluster being arranged adjacent to each other, and used to respectively acquire a first imaging result and a second imaging result both containing an indicating mark; and
    a processor electrically connected to the image acquiring module and adapted to track a proceeding direction of the indicating mark by computing difference between the first imaging result and the second imaging result.

2. The optical detecting device of claim 1, wherein the optical detecting device further comprises a memory module electrically connected to the processor, and the processor analyzes the computed difference via a lookup table stored inside the memory module to determine the proceeding direction.

3. The optical detecting device of claim 1, wherein the optical detecting device is applied to an automated guided vehicle, and the processor outputs a control command to steer the automated guided vehicle according to the proceeding direction.

4. The optical detecting device of claim 3, wherein the processor utilizes image identifying technique to identify an arrow icon on the indicating mark, and generates the control command to steer the automated guided vehicle according to the arrow icon.

5. The optical detecting device of claim 3, wherein the processor analyzes a color or a decorative pattern of the indicating mark and generates the control command according to a color analyzing result or a decorative pattern analyzing result.

6. The optical detecting device of claim 1, wherein the image acquiring module comprises one image detector, and an image acquired by the image detector is grouped into a pixel array of the first cluster and a pixel array of the second cluster.

7. The optical detecting device of claim 1, wherein the image acquiring module comprises a first image detector and a second image detector, a first image acquired by the first image detector is a pixel array of the first cluster, and a second image acquired by the second image detector is a pixel array of the second cluster.

8. The optical detecting device of claim 1, wherein an arranging direction of the first cluster and the second cluster is crossed by a lengthwise direction of the indicating mark.

9. The optical detecting device of claim 1, wherein a boundary between the first cluster and the second cluster aligns with a middle of the indicating mark.

10. The optical detecting device of claim 1, wherein a dimension of the first cluster is similar to or identical with a dimension of the second cluster.

11. The optical detecting device of claim 1, wherein the processor acquires a first computed value of the first imaging result and a second computed value of the second imaging result, and then decides the proceeding direction according to a ratio of the first computed value to the second computed value.

12. The optical detecting device of claim 11, wherein the first computed value and the second computed value are pixel mean values of the first cluster and the second cluster.

13. The optical detecting device of claim 1, wherein the image acquiring module is further grouped into the first cluster, the second cluster, a third cluster and a fourth cluster of pixels, the third cluster and the fourth cluster are arranged adjacent to each other and respectively adjoin the first cluster and the second cluster.

14. The optical detecting device of claim 13, wherein a dimension of the third cluster is similar to or identical with a dimension of the fourth cluster.

15. The optical detecting device of claim 13, wherein the processor further computes difference between a third imaging result of the third cluster and a fourth imaging result of the fourth cluster for determining the proceeding direction via the computed differences between the first cluster and the second cluster and between the third cluster and the fourth cluster.

16. The optical detecting device of claim 1, wherein the processor adjusts a sampling speed of the image acquiring module according to a bending degree of the indicating mark.

17. The optical detecting device of claim 1, wherein the processor acquires a first distributed value of the first cluster and a second distributed value of the second cluster, and determines width variation of the indicating mark according to the first distributed value and the second distributed value.

18. The optical detecting device of claim 17, wherein the first distributed value and the second distributed value are a ratio of a specific pixel value to a background pixel value.

19. The optical detecting device of claim 17, wherein the optical detecting device is applied to an automated guided vehicle, and the processor outputs a control command according to the width variation for adjusting a moving speed of the automated guided vehicle.

20. The optical detecting device of claim 1, wherein the first cluster is at least one row of pixels crossed by a lengthwise direction of the indicating mark.

21. The optical detecting device of claim 1, wherein the image acquiring module has a field of view for facing the indicating mark, and acquires an image matrix constructed from pixel arrays of the first cluster and the second cluster.

* * * * *